US012648065B2

(12) United States Patent
Beddar

(10) Patent No.: US 12,648,065 B2
(45) Date of Patent: Jun. 2, 2026

(54) METHOD FOR CONTROLLING A PIXELATED LIGHT SOURCE

(71) Applicant: VALEO VISION, Bobigny (FR)

(72) Inventor: Sidahmed Beddar, Bobigny (FR)

(73) Assignee: Valeo Vision, Bobigny (FR)

( * ) Notice: Subject to any disclaimer, the term of this patent is extended or adjusted under 35 U.S.C. 154(b) by 80 days.

(21) Appl. No.: 18/256,229

(22) PCT Filed: Dec. 10, 2021

(86) PCT No.: PCT/EP2021/085310

§ 371 (c)(1),
(2) Date: Jun. 7, 2023

(87) PCT Pub. No.: WO2022/123059

PCT Pub. Date: Jun. 16, 2022

(65) Prior Publication Data

US 2024/0107645 A1 Mar. 28, 2024

(30) Foreign Application Priority Data

Dec. 11, 2020 (FR) ....................................... 2013081

(51) Int. Cl.
*H05B 45/56* (2020.01)
*H05B 45/18* (2020.01)

(52) U.S. Cl.
CPC ............. *H05B 45/56* (2020.01); *H05B 45/18* (2020.01)

(58) Field of Classification Search
CPC ......... H05B 45/56; H05B 45/18; Y02B 20/30
See application file for complete search history.

(56) References Cited

U.S. PATENT DOCUMENTS

| | | | | |
|---|---|---|---|---|
| 7,812,553 | B2 | 10/2010 | Kang et al. | |
| 8,937,587 | B2 | 1/2015 | Nakajima | |
| 9,177,503 | B2 * | 11/2015 | Lynch | H10K 59/65 |
| 9,560,702 | B2 | 1/2017 | Franck et al. | |

(Continued)

FOREIGN PATENT DOCUMENTS

| | | | |
|---|---|---|---|
| CN | 101155450 | A | 4/2008 |
| CN | 105659698 | A | 6/2016 |

(Continued)

OTHER PUBLICATIONS

Japan Patent Office, Office Action (with English translation) of corresponding Japanese Patent Application No. 2023-535577, posted Apr. 30, 2024.

(Continued)

*Primary Examiner* — Renan Luque
(74) *Attorney, Agent, or Firm* — Valeo Vision

(57) ABSTRACT

The invention relates to a method for controlling a pixelated light source for a motor vehicle. The method makes it possible to prevent thermal runaway and premature ageing of the elementary pixels of the source independently of the projected light levels. By dynamically adapting the electric current intensities at the elementary light sources, the control method provides protection for the semiconductor junctions of the pixels of the pixelated light source in order to increase their lifespan and avoid visible defects in a beam projected onto the road due to thermal runaway or premature ageing of the semiconductor junctions.

9 Claims, 3 Drawing Sheets

(56) References Cited

U.S. PATENT DOCUMENTS

| | | | |
|---|---|---|---|
| 10,820,390 | B2 | 10/2020 | Baumheinrich et al. |
| 11,028,992 | B2 | 6/2021 | Lefaudeux et al. |
| 11,307,241 | B2 | 4/2022 | Sorensen et al. |
| 2008/0136331 | A1 | 6/2008 | Schmeikal |
| 2011/0163691 | A1 | 7/2011 | Dunn |
| 2020/0060004 | A1 * | 2/2020 | Baumheinrich ....... H05B 45/44 |
| 2023/0007747 | A1 * | 1/2023 | Bonne .................. H05B 45/325 |

FOREIGN PATENT DOCUMENTS

| | | | |
|---|---|---|---|
| CN | 109716196 | A | 5/2019 |
| JP | 2005195444 | A | 7/2005 |
| JP | 2012237972 | A | 12/2012 |
| JP | 2017193257 | A | 10/2017 |
| WO | 2010016440 | A1 | 2/2010 |

OTHER PUBLICATIONS

Japan Patent Office, Search Report (with English translation) of corresponding Japanese Patent Application No. 2023-535577, posted May 7, 2024.

European Patent Office, International Search Report (with English translation) and Written Opinion of corresponding International Application No. PCT/EP2021/085310, dated Mar. 10, 2022.

China Patent Office, Office Action (with English Translation) and Search Report of corresponding Chinese Application No. 202180082872.5, dated Oct. 18, 2025, 15 pages.

* cited by examiner

METHOD FOR CONTROLLING A PIXELATED LIGHT SOURCE

TECHNICAL FIELD

The invention relates to the field of motor-vehicle lighting systems, and in particular it relates to such systems using pixelated sources.

BACKGROUND OF THE INVENTION

A light-emitting diode (LED) is an electronic semiconductor component capable of emitting light of a predetermined wavelength when a voltage at least equal to a threshold value is applied across its terminals. Above this threshold value, which is called the forward voltage, the intensity of the luminous flux emitted by an LED generally increases with the average amplitude of the supply current. With heating of the semiconductor junction, the amplitude of the current tends to increase at constant applied voltage. Their small size and low electricity consumption make LED components advantageous in the field of motor-vehicle light-emitting modules. LED-based light sources may for example be used to produce distinctive optical signatures by placing the components along predetermined outlines. Use of LED components also facilitates production of lights able to perform multiple lighting functions.

It is also known to use pixelated light sources in various types of technologies to project these light beams according to image data. For example, this involves monolithic technology, in which a high number of elementary LED sources are etched into a common semiconductor substrate, the elementary LED sources then being equivalent to pixels. The substrate may further comprise on-board electronic components, such as switching circuits or the like. Integrated electrical connections allow the pixels to be activated independently of one another. It has especially been proposed to use voltage to drive such pixelated light sources: with a constant voltage applied to a pixelated light source, the individual pixels may be controlled by way of one switch per pixel, each switch being controlled by one binary signal. The control signal delivered to a pixel may for example be a PWM signal (PWM standing for Pulse Width Modulation), the duty cycle of which will have a direct impact on the average amplitude of the current passing through the pixel, and therefore on its degree of luminosity.

Alternatively, current may also be used to drive a pixelated light source. Each elementary light source forming one pixel is associated with one dedicated current source. Thus, the amplitude of the current passing through a given pixel, and therefore the light intensity emitted by this pixel, may be adjusted directly. By acting on a PWM signal, the average amplitude of the current may also be decreased for a given DC current amplitude.

Pixelated light sources may be used to perform HB functions (HB standing for High Beam), or complex functions such as ADB functions (ADB standing for Adaptive Driving Beam) inter alia. For voltage-driven light sources, provision is generally made to deliver a constant supply voltage. However, at constant voltage, the amplitude of the current passing through a semiconductor junction, such as the junction of an electroluminescent pixel for example, increases linearly with temperature. Junction temperature increases when a current passes through the junction. For pixels required to work for a long time, there is therefore a risk of thermal runaway: the more the semiconductor junction is heated by the current passing through it, the more the amplitude of the current increases, until the junction fails or is irreversibly destroyed. This risk is more pronounced in pixels in a central region of the pixelated light source, which take part in a plurality of vehicle lighting functions, and which are therefore required to work more regularly. Failures in this region may lead to visible failures in the light beam projected onto the road. As an exact temperature measurement per pixel is currently not feasible, it is difficult to predict which spots are potentially overheating in a pixelated light source which, when operating, is liable to project a series of different images.

In the case of current control, the risk of thermal runaway is reduced. However, substantial overheating of each semiconductor junction may accelerate premature aging, and increase the risk of failure.

SUMMARY OF THE INVENTION

The aim of the invention is to overcome at least one of the problems posed by the prior art. More precisely, the aim of the invention is to provide a method for controlling a pixelated light source, which makes it possible to avoid risks related to overheating of the elementary pixels of the source.

According to a first aspect of the invention, a method for controlling a pixelated light source for a motor vehicle is provided. The pixelated light source comprises a plurality of elementary electroluminescent-semiconductor-component-based light sources. The method is noteworthy in that it comprises at least the steps of:

i) controlling, by means of a control unit, the pixelated light source so as to project a light beam corresponding to image data, by driving each elementary light source with a control signal that determines a first average amplitude of the current passing through said elementary light source;
ii) obtaining, by means of a plurality of temperature sensors placed at predetermined locations, a temperature profile of the pixelated light source;
iii) estimating, by means of the control unit, the position of a hot spot of the pixelated light source on the basis of the image data and of the obtained temperature profile;
iv) estimating, by means of the control unit, a temperature value of said hot spot depending on the obtained temperature profile and on its estimated position with respect to the locations of the temperature sensors;
v) modifying, by means of the control unit, the command delivered to the pixelated light source so that at least one group of the elementary light sources comprising the elementary light source that is located at the estimated position of the hot spot is passed through by a current of a second average amplitude lower than the first amplitude, if the estimated temperature value is higher than a predetermined threshold temperature value.

The pixelated light source may preferably comprise a pixelated light source intended to be voltage-controlled.

The pixelated light source may preferably comprise a pixelated light source intended to be voltage-controlled.

According to another aspect of the invention, a method for controlling a pixelated light source for a motor vehicle is provided. The pixelated light source is intended to be voltage-driven and comprises a plurality of electroluminescent-semiconductor-component-based elementary light sources. The method is noteworthy in that it comprises at least the steps of:

i') controlling, by means of a control unit, the pixelated light source so as to project a light beam corresponding to image data, by delivering thereto a first voltage level, and by driving each elementary light source with a DC-current-modulating pulse-width-modulation signal that determines a first average amplitude of the current passing through said elementary light source;

ii') obtaining, by means of a plurality of temperature sensors placed at predetermined locations, a temperature profile of the pixelated light source;

iii') estimating, by means of the control unit, the position of a hot spot of the pixelated light source on the basis of the image data and of the obtained temperature profile;

iv') estimating, by means of the control unit, a temperature value of said hot spot depending on the obtained temperature profile and on its estimated position with respect to the locations of the temperature sensors;

v') modifying, by means of the control unit, the command delivered to the pixelated light source so that each of the elementary light sources is passed through by a current of a second average amplitude lower than the first amplitude, if the estimated temperature value is higher than a predetermined threshold temperature value.

Preferably, the step of estimating the position of a hot spot may comprise searching for the obtained temperature profile among a plurality of pre-recorded temperature profiles stored beforehand in a memory element, each profile being associated with particular image data and with a hot-spot position associated with these data.

The step of estimating a temperature value of said hot spot may preferably comprise a step of incrementing at least one of the temperature values of the obtained temperature profile, using a predetermined increment that depends on the estimated position of the hot spot.

Preferably, the step of estimating a temperature value may further comprise taking into account the projected image data, a high luminosity value of a pixel corresponding to a hot elementary light source.

Preferably, the pixelated light source may be intended to be voltage-controlled, and the command that determines a first average amplitude of the current passing through each elementary light source may preferably comprise a first voltage level.

The step of modifying the command may preferably comprise a step of delivering a second voltage level, lower than the first voltage level, to the pixelated light source if the estimated temperature value is higher than a predetermined threshold temperature value.

Preferably, the step of modifying the command may comprise a prior step of comparing said estimated temperature value with said predetermined threshold temperature value, the predetermined threshold temperature value being dependent on the delivered first voltage level.

The method may preferably comprise a preliminary step of making available, in a memory element, reference data relative to the pixelated light source, said data relating, for a row of operating temperatures of the pixelated light source, driving voltage values with corresponding supply-current amplitudes, and the step of modifying the command comprises choosing the second voltage level depending on the estimated temperature value, in order to respect a predetermined threshold current amplitude.

Preferably, the pixelated light source may be intended to be current-controlled, and the command that determines a first average amplitude of the current passing through each light source may comprise a first current amplitude for each elementary light source. Preferably, step v of modifying the command may comprise a step of delivering a second current level, lower than the first current level, to at least one group of elementary light sources of the pixelated light source if the estimated temperature value is higher than a predetermined threshold temperature value.

The step of modifying the command may preferably comprise a step of driving each elementary light source with a DC-current-modulating pulse-width-modulation signal that determines a second average amplitude of the current passing through said elementary light source, the second average amplitude being lower than the first average amplitude if the estimated temperature is higher than a predetermined threshold temperature value.

According to another aspect of the invention, a light-emitting assembly for a motor vehicle is provided. It may for example be a question of a lighting module. The assembly comprises a pixelated light source having a plurality of elementary electroluminescent-semiconductor-component-based light sources, the pixelated light source, a plurality of temperature sensors intended to deliver a temperature profile of the pixelated light source when it is projecting image data, and a control unit. The assembly is noteworthy in that the control unit is configured to control the pixelated light source depending on an estimated temperature value of a hot spot of the pixelated light source, which depends on an estimated position of the hot spot and on the image data. Preferably, the pixelated light source may be intended to be either voltage-controlled or current-controlled.

Preferably, the control unit may be configured to carry out the steps of a method according to one aspect of the invention.

The assembly may preferably comprise a memory element functionally connected to the control unit and comprising pre-recorded reference data relative to the pixelated light source.

The pixelated light source may preferably comprise at least one temperature sensor able to deliver a temperature indication to the control unit. The temperature profile may preferably comprise a temperature measurement or indication delivered by each of the temperature sensors. Each temperature value of the temperature profile may preferably be associated with the position of the temperature sensor that performed the measurement, with respect to the pixelated light source.

Through use of the measures proposed by the present invention, it becomes possible to provide a method for driving a pixelated light source for a motor vehicle that is voltage- or current-driven, and that allows risks associated with over-heating of the constituent elementary light sources to be avoided. In particular, the risk of thermal runaway of the elementary pixels of the source and the risk of premature aging is reduced dynamically. By lowering the electrical supply voltage, or by reducing the average amplitude of the current in each pixel when a threshold temperature, preferably corresponding to a maximum threshold current amplitude, is exceeded, the driving method protects the semiconductor junctions of the pixels of the pixelated light source, with a view to increasing their lifespan and to avoiding visible faults in a beam projected onto the road. A light-emitting module implementing the proposed driving and temperature-regulating method therefore constitutes a more durable and more economical solution compared to known prior-art products.

BRIEF DESCRIPTION OF DRAWINGS

Other features and advantages of the present invention will be better understood with the aid of the description of the examples and of the drawings, in which.

DETAILED DESCRIPTION OF THE INVENTION

Unless specified otherwise, technical features described in detail with respect to a given embodiment may be combined with the technical features described in the context of other embodiments described by way of example and non-limitingly.

The description focuses on the elements, of a control method and of a light-emitting assembly for a motor vehicle, that are necessary to understand the invention. Other elements, which in a known manner for example form part of such assemblies, will not be mentioned or described in detail. For example, the presence of a carrier or of heat-dissipating elements are implicit to the operation of such a module.

A light-emitting module or assembly for a motor vehicle such as involved in implementation of a control method according to a first embodiment according to the invention makes it possible to project lighting functions based on image data. The module comprises a light source able to project a pixelated light beam. An image generally comprises a matrix array of pixel values, each value corresponding to a degree of luminosity to be produced by a corresponding elementary light source of the lighting module. Generally, the pixelated light source is either supplied with voltage or current. When the pixelated light source is supplied with voltage, at a given time, the same voltage is applied across the terminals of each pixel, which is equivalent to an elementary source formed by a miniaturized electroluminescent semiconductor component. The degree of luminosity to be emitted by each pixel is controlled by the duty cycle of a PWM control signal (PWM standing for Pulse Width Modulation) that selectively and periodically switches the pixel on and off. For a duty cycle of 100%, the amplitude of the average current passing through a pixel is equal to its maximum or peak amplitude, this generating a maximum luminosity. For lower degrees of intensity, a lower duty cycle results in a lower average value of the average amplitude of the current passing through the pixel. The maximum amplitude of the current is dependent on the voltage value applied to the pixelated light source.

When the pixelated light source is of the type to be supplied with current, it generally incorporates one independently driven current source for each pixel. The degree of luminosity to be emitted by each pixel is controlled via a value of the amplitude of the current to be delivered by the current source associated with the pixel. The duty cycle of a PWM control signal that selectively and periodically switches the pixel on and off may also influence the average value of the amplitude of the current passing through the pixel, without modifying the nominal amplitude of the current delivered to the pixel.

Figure 1:
FIG. 1 is a chart showing the main steps of a method according to one preferred embodiment of the invention.

FIG. 1 shows the main steps of a driving method according to a first embodiment of the invention. In a first step i, a first voltage level is delivered to a pixelated light source intended to be voltage-driven. The pixelated light source comprises a plurality of elementary LED light sources (LED standing for light-emitting diode). Each elementary light source is intended to produce a luminous pixel of the image projected by the pixelated light source. Image data represent an image to be projected (for example a beam of a particular shape) and determine the degree of luminosity (typically between 0 and 255) to be produced by each elementary light source. At equal voltage and at equal temperature, each elementary light source is supplied with a current of the same amplitude. This maximum amplitude is reduced individually for each elementary light source, by applying thereto a DC-current-modulating PWM signal, which modulates the DC current delivered by a control unit that for example takes the form of a microcontroller element. The duty cycle of this signal directly impacts the average magnitude of the amplitude of the current supplying an elementary light source, which is proportional to the emitted luminosity. The pixelated light source is therefore assumed to be being supplied a voltage having a first level, and each elementary light source is assumed to be being supplied a current of a first amplitude, which determines the luminosity of the projected pixel corresponding thereto.

In a second step ii, a plurality of temperature sensors placed in predetermined locations in proximity to the matrix array of elementary light sources deliver an indication of their ambient temperature to the control unit. Next, the position of a hot spot of the pixelated light source is estimated on the basis of the projected image data, which are available to the control unit, and using the temperature profile, which is composed of the obtained temperature measurements. Ideally, each sensor delivers a measurement that forms part of the obtained temperature profile. This corresponds to step iii. In the following step, step iv, the control unit evaluates a temperature value representative of the temperature of the hot spot thus determined. Ideally, this hot spot corresponds to the hottest spot of the pixelated light source at the time of the measurement: it is therefore a question of the junction temperature that is the highest among all the elementary light sources. If this temperature is higher than a predetermined threshold value, the control unit produces a command which aims to reduce the average amplitude of the current flowing through all the elementary light sources of the matrix array, in order to guarantee the relative brightness differences between the projected pixels, while reducing the risk of thermal runaway (corresponding to linear overheating over time) for the elementary light sources at risk, i.e. those that are the hottest.

Figure 2:
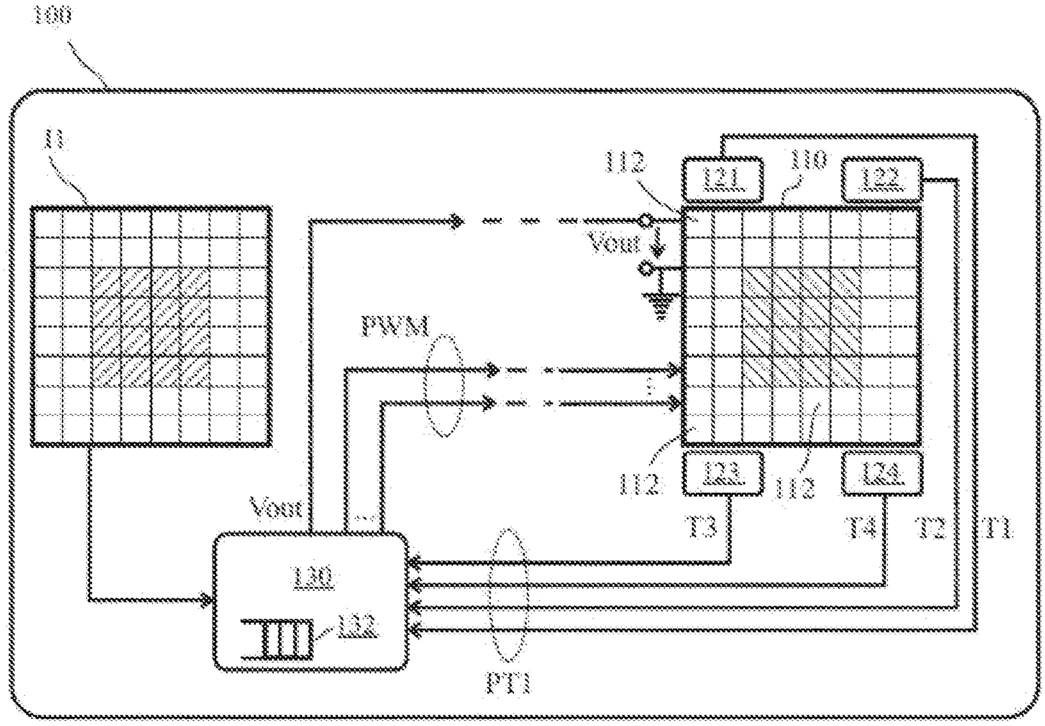
FIG. 2 is a schematic illustration of a light-emitting assembly according to one preferred embodiment of the invention.

FIG. 2 shows a light-emitting assembly 100 for a motor vehicle according to a first embodiment. The illustrated system comprises a control unit 130 of a pixelated light source 110, for example a monolithic pixelated light source. The pixelated light source comprises a plurality of elementary light sources 112 arranged in the form of a matrix array. The control unit may for example comprise, or control via an electrical connection, a drive circuit of the electrical power supply of the pixelated light source 110. In a known manner, such drive circuits may comprise step-down converter circuits, for example of the "buck" type, and step-up converter circuits, for example of the "boost" type. These circuits are known per se in the art, and their operation will not be described in detail in the context of the present invention. A converter circuit especially makes it possible to convert a voltage delivered to its input (not shown) into an output voltage Vout, determined by the control unit 130, and having a value different from the input voltage. Depending on the chosen architecture, the output voltage may be higher or lower than the input voltage. Such circuits are commonly used in the context of supply of power to light sources based on electroluminescent semiconductor components, i.e. components such as light-emitting diodes (LEDs) for example. Specifically, such light sources must be supplied with a voltage at least equal in value to their forward voltage, which may be different from the available voltage, which is for example delivered by a battery of a motor vehicle.

The pixelated light source 110 is supplied with voltage and may comprise hundreds or thousands of pixels 112. The luminous intensities emitted by the individual pixels are controlled via periodic on/off signals PWM, as described above. The control unit has access to image data I1, which correspond to at least one digital image, also referred to as a photometric image. The photometric images may be stored in a memory element to which the control unit has read access. Following a signal received from a central control unit of the motor vehicle, the control unit then selects a suitable photometric image from a plurality of available photometric images. It is also possible for the control unit 130 to be configured to generate a photometric image according to instructions received on a data bus internal to the motor vehicle (not shown). Alternatively, the control unit 130 may receive the image data I1 on such a data bus, for example of the CAN type (CAN standing for Car Area Network). The control unit 130 preferably comprises computing means configured to convert the image data I1 received for each pixel of the image into a supply voltage Vout and signals PWM intended for the pixelated light source 110 and elementary light sources 112, respectively, so that a light beam conforming to the data I1 is projected.

Although a high degree of luminosity leads to greater heating of the corresponding elementary light sources, how hot the elementary light sources 112 will get cannot in general be accurately predicted solely on the basis of the data of the projected image I1. This is due, among other things, to parasitic heating caused by neighboring light sources, to imperfections in the light sources due to their respective manufacturing processes, or to previous projections, which may result in residual heat remaining in a number of elementary light sources.

Preferably, the pixelated light source 110 comprises a plurality of temperature sensors 121, 122, 123, 124 physically close to the semiconductor junctions. In the example of FIG. 2, there are four sensors, the invention not being limited to this example. It may for example be a question of thermistors or other temperature sensors known per se in the art, or advantageously PTAT sensors (PTAT standing for Proportional To Absolute Temperature). The proximity to the matrix array of elementary light sources allows the sensors to deliver a realistic indication of the operating temperature of regions of pixels of the pixelated light source 110, when the latter is being supplied with electricity.

According to one preferred embodiment, a plurality of temperature sensors may be integrated into the substrate of the light source, and a plurality of temperature indications, corresponding to a plurality of zones or to a plurality of pixels, may be delivered by way of electrical signals T1, T2, T3, T4 to the control unit 130, thus forming a temperature profile PT1 corresponding to the projection of the image data I1.

The delivered temperature profile PT1 does not allow the exact temperature values of all the elementary light sources to be accessed. Thus, in step iii of the proposed method, a position of a hot spot is estimated by the control unit. In the given example, a central zone of the image data I1 is turned on. Thus, the elementary light sources corresponding to the center of the pixelated light source 110 run the risk of heating up the most during the projection of the image I1. This zone is far from all the temperature sensors 121, 122, 123, 124, the positions of which are known. Similar or alike indications T1, T2, T3, T4 are therefore probable in this example. Conversely, such a uniform temperature profile may allow it to be estimated that the hot spot is located in a central zone of the matrix array.

However, none of these values corresponds to the exact temperature of the central zone. In order to estimate the temperature of the central zone, the control unit 130 may for example make recourse to a database comprising predetermined temperature profiles, associated with predetermined photometric images I1, I2, . . . , IN, and with corresponding maximum temperatures. These data may for example be obtained beforehand by simulation, or by measurement using a thermal camera of the elementary light sources while they are projecting the corresponding photometric images. By comparing the temperature profile PT1 with the profiles of the database, especially in respect of the projected image I1, the control unit may thus determine a temperature, or a temperature increment, that must be added to the values of the obtained temperature profile PT1, to obtain a realistic indication of the temperature in the central, turned-on zone. In the provided example, for the zone farthest from the sensors 121, 122, 123, 124, which are at the corners of the pixel matrix array 110, the increment ΔT1 may be of a value comprised between 15 and 30° C., and for example 25° C. The estimated temperature T is for example given by T2+ΔT1°.

The values of the increments or temperature values stored in the database, which depend on the positions of determined hot spots, may optionally be adapted depending on the operating time of the temperature sensors, to take into account measurement errors due to a variation in sensor sensitivity, which generally deteriorates with operating time.

Figure 3:
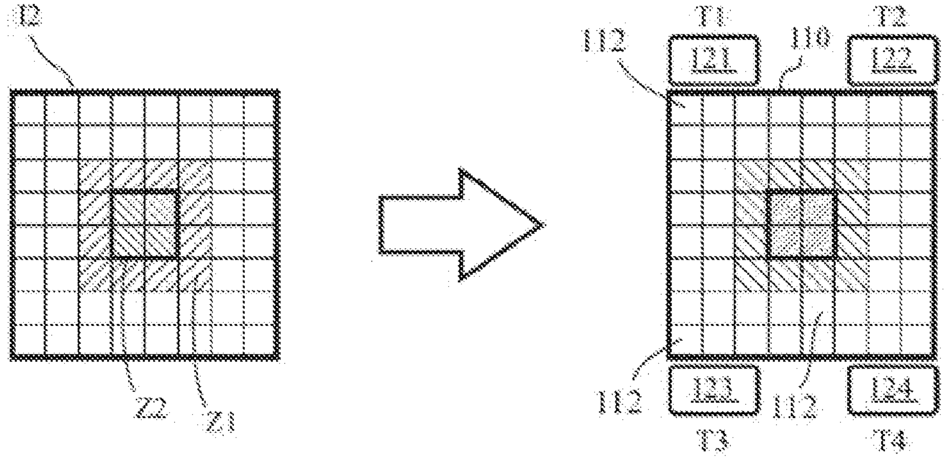
FIG. 3 is a schematic illustration of image data and of a light source that projects these image data and that includes temperature sensors, according to one preferred embodiment of the invention.

The increment depends at least on the estimated position of the hot spot, on the known position of the temperature sensors, and on the projected image. FIG. 3 gives another example. The projected photometric image I2 comprises a first turned-on zone Z1 and a smaller, brighter central zone Z2. The four central elementary light sources 112 run a pronounced risk of overheating. However, because of the large distance of the sensors 121, 122, 123, 124 from this central zone, and as a result of a lack of sensitivity, the temperature values T1, T2, T3, T4 are very similar to those of the previous example. To determine the temperature of the central zone, it is therefore advantageous to compare the image data of the zone Z2 to the image data of the zone Z1. Since it is known that the image I2 and not the image I1 is being projected, the image data allow the control unit 130 to remove the ambiguity induced by the obtained temperature profile considered in isolation, and to determine that an increment ΔT2 larger than ΔT1 is to be added to the temperatures obtained by the sensors, in order to deliver a realistic estimate of the hottest temperature of the pixelated light source 110. Using only the temperature values, the hot spot of this example would be unable to be differentiated from the hot spot of the example in FIG. 3, even though the four central pixels may experience significantly greater heating, and therefore run a more pronounced risk of thermal runaway. The more accurate estimate allows the control unit 130 to react differently, in a more nuanced way, in the two examples of projection I1, I2 shown.

Figure 4:
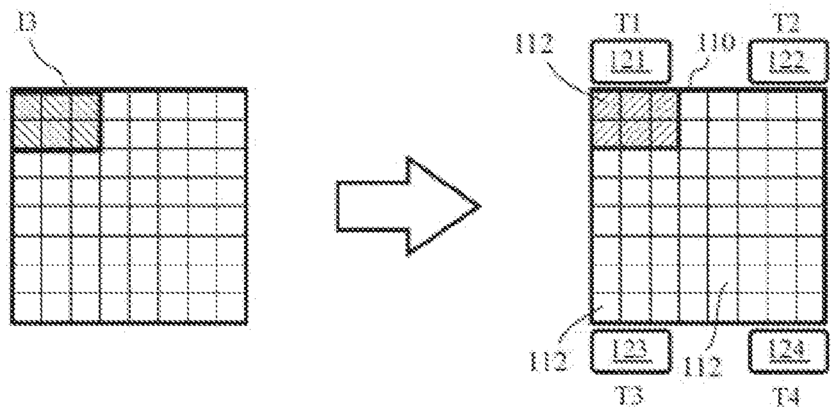
FIG. 4 is a schematic illustration of image data and of a light source that projects these image data and that includes temperature sensors, according to one preferred embodiment of the invention.

Another example is illustrated in FIG. 4. The photometric image I3 that is projected comprises a turned-on zone at the top left. In this example, the temperature value T1 will be clearly higher than the temperatures T2, T3, T4. Thus, considered in isolation, the temperature profile delivered by the sensors will allow the position of the hot spot in the zone in direct proximity to the sensor 121 to be evaluated: this zone is the quadrant at the top left of the pixel matrix array 110. Taking into account the image data I3 optionally allows this position estimate to be refined. In the case shown, the temperature value T1 is to be incremented by a small value, or even by an increment of zero, to achieve a correct hot-spot estimate. Specifically, the elementary light sources susceptible to overheating are close to one of the available temperature sensors.

Thus, after estimating the position of the hot spot of the pixelated light source 110, the control unit is configured to determine an estimate of the temperature value T of the hot spot, depending on the estimated position, and preferably depending on the projected image data I1, I2, I3. The control unit 130 is in addition configured to determine, based on the delivered first supply-voltage level, and based on the corresponding estimated temperature T of the hot spot of the pixelated light source, if there is a need to lower the amplitude of the current in the pixelated light source, in order to prevent thermal runaway from occurring.

For example, if the estimated temperature T of the hot spot exceeds a predetermined threshold value, the first voltage level is thus lowered to a lower, second voltage level. This causes the amplitude of the maximum, or peak, current passing through the pixels 121 of the pixelated light source 110 to decrease, thus avoiding overheating of the corresponding semiconductor junctions.

According to one preferred embodiment of the invention, the control unit 130 comprises, or has write access to, a memory element 132 (illustrated in FIG. 2) in which reference data relative to the pixelated light source 110 are stored. These data may for example be provided at the time of production or assembly of the light-emitting module.

Figure 5:
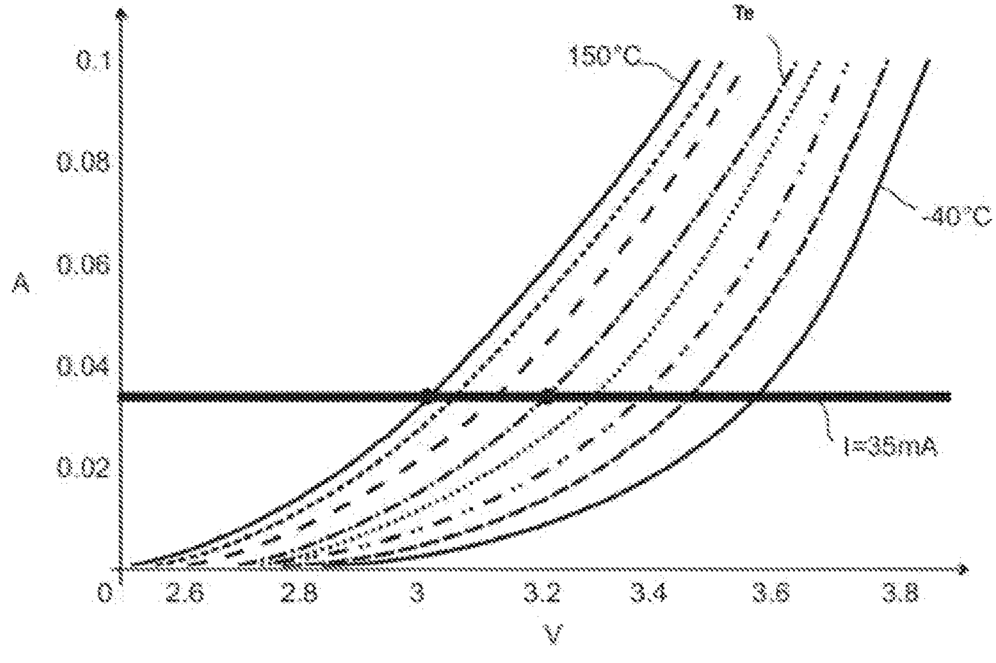
FIG. 5 is an illustration of reference data of a pixelated light source such as involved in a method according to one preferred embodiment of the invention.

FIG. 5 shows one non-limiting example of reference data that may be used by the control unit in order to perform step v of the control method according to one preferred embodiment of the invention. It is a question of data characterizing the electro-thermal behavior of the pixels of the pixelated light source.

In the example shown, exceeding a threshold current amplitude set at 35 mA risks permanent failure of the pixels of the pixelated light source. The control unit therefore ensures that this threshold is not exceeded for an extended period of time. The reference data provide, for an operating temperature range extending for example from −40° C. to 150° C., curves associating the drive voltage (in volts) with the amplitude of the resulting current (in amps). It should be clear that the threshold temperature to which the temperature indication T is compared by the control unit, may depend on the value of the first voltage, initially delivered to the pixelated light source, and which is the origin of the estimated temperature T of the hot spot of the matrix array. For example, at a voltage of 3.2 V, the maximum current amplitude is reached at a temperature Te, as indicated by the intersection of the curve Te and the threshold current ceiling I. If the hot-spot temperature estimate T obtained by the method is higher than Te while the delivered first drive-voltage level is higher than 3.2 V, the control unit orders delivery of a second drive-voltage level, lower than 3.2, to the driving device. In contrast, at an initially delivered voltage of 3 V, the operating temperature Te of the hot spot may increase up to 150° C. before a drop in drive voltage is ordered by the control unit. Continuous application of this method allows temperature to be regulated dynamically without the risk of thermal runaway being run. The threshold value with which the indication of the estimated temperature T of the hot spot is compared therefore depends on the delivered first voltage level. The second voltage level is chosen so that the maximum current passing through the pixels of the pixelated light source does not exceed a predetermined maximum threshold amplitude, for example of 35 mA.

In one alternative embodiment, the voltage level Vout may be kept at the first level, and, to reduce the average amplitude of the currents flowing through the elementary light sources, the PWM signals controlling these average current amplitudes may be adapted by reducing their duty cycles by a predetermined factor, which is preferably identical for all the elementary light sources. A combination of adaptation of the voltage control and of PWM signals may also be envisioned without departing from the scope of the present invention.

Figure 6:
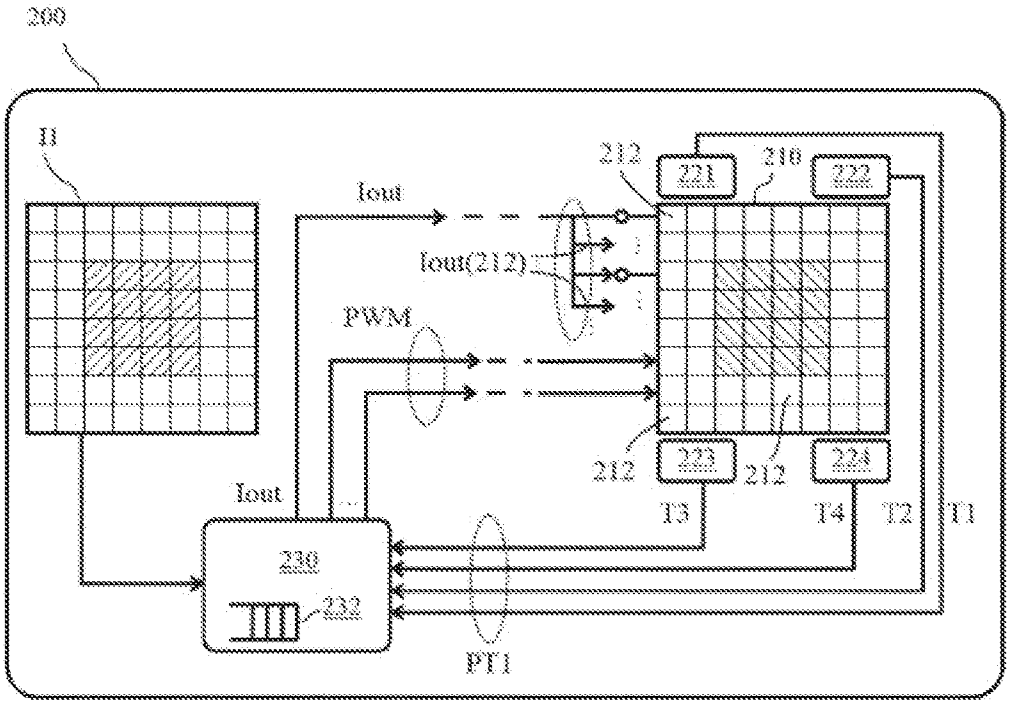
FIG. 6 is a schematic illustration of a light-emitting assembly according to one preferred embodiment of the invention.

FIG. 6 shows an embodiment of a light-emitting assembly 200 for a motor vehicle according to a second embodiment. This embodiment makes it possible to carry out the adaptations explained by way of example in the context of FIGS. 3-5, when the pixelated light source is current-controlled.

The illustrated system comprises a control unit 230 of a pixelated light source 210. The pixelated light source comprises a plurality of elementary light sources 212 arranged in the form of a matrix array. The control unit may for example comprise, or control via an electrical connection, a drive circuit of the electrical power supply of the pixelated light source 210.

The pixelated light source 210 is supplied with current and may comprise hundreds or thousands of pixels 212. The luminous intensities emitted by the individual pixels are dependent on the respective current amplitudes passing through them. Each pixel 212 is associated with one current source that is dedicated thereto. These current sources are integrated into the pixelated light source 210. Following receipt of a current command Iout (212) for a pixel 212, the current source associated with this pixel 212 is able to deliver the current of the corresponding amplitude to the pixel. The pixels may also be controlled via periodic on/off signals PWM, as described above: at constant nominal current, the modulation of the signal PWM makes it possible to act on the average amplitude of the current passing through a pixel. The control unit 230 has access to image data I1, which correspond to at least one digital image, also referred to as a photometric image. The photometric images may be stored in a memory element to which the control unit has read access. Following a signal received from a central control unit of the motor vehicle, the control unit then selects a suitable photometric image from a plurality of available photometric images. It is also possible for the control unit 230 to be configured to generate a photometric image according to instructions received on a data bus internal to the motor vehicle (not shown). Alternatively, the control unit 230 may receive the image data I1 on such a data bus, for example of the CAN type (CAN standing for Car Area Network). The control unit 230 preferably comprises computing means configured to convert the image data I1 received for each pixel of the image into current values Iout(212) for each pixel 212, which are grouped together in the control signal Iout, and into signals PWM, intended for the pixelated light source 210 and elementary light sources 212, respectively, so that a light beam conforming to the data I1 is projected.

Although a high degree of luminosity leads to greater heating of the corresponding elementary light sources, how hot the elementary light sources 212 will get cannot in general be accurately predicted solely on the basis of the data of the projected image I1. This is due, among other things, to parasitic heating caused by neighboring light sources, to imperfections in the light sources due to their respective manufacturing processes, or to previous projections, which may result in residual heat remaining in a number of elementary light sources.

Preferably, the pixelated light source 210 comprises a plurality of temperature sensors 221, 222, 223, 224 physically close to the semiconductor junctions. In the example of FIG. 6, there are four sensors, the invention not being limited to this example. It may for example be a question of thermistors or other temperature sensors known per se in the art, or advantageously PTAT sensors (PTAT standing for Proportional To Absolute Temperature). The proximity to the matrix array of elementary light sources allows the sensors to deliver a realistic indication of the operating temperature of regions of pixels of the pixelated light source 210, when the latter is being supplied with electricity. According to one preferred embodiment, a plurality of temperature sensors may be integrated into the substrate of the light source, and a plurality of temperature indications, corresponding to a plurality of zones or to a plurality of pixels, may be delivered by way of electrical signals T1, T2, T3, T4 to the control unit 230, thus forming a temperature profile PT1 corresponding to the projection of the image data I1.

The delivered temperature profile PT1 does not allow the exact temperature values of all the elementary light sources to be accessed. Thus, in step iii of the proposed method, a position of a hot spot is estimated by the control unit. In the given example, a central zone of the image data I1 is turned on. Thus, the elementary light sources corresponding to the center of the pixelated light source 210 run the risk of heating up the most during the projection of the image I1. This zone is far from all the temperature sensors 121, 122, 123, 124, the positions of which are known. Similar or alike indications T1, T2, T3, T4 are therefore probable in this example. Conversely, such a uniform temperature profile may allow it to be estimated that the hot spot is located in a central zone of the matrix array.

However, none of these values corresponds to the exact temperature of the central zone. In order to estimate the temperature of the central zone, the control unit 230 may for example make recourse to a database comprising predetermined temperature profiles, associated with predetermined photometric images I1, I2, . . . , IN, and with corresponding maximum temperatures. These data may for example be obtained beforehand by simulation, or by measurement using a thermal camera of the elementary light sources while they are projecting the corresponding photometric images. By comparing the temperature profile PT1 with the profiles of the database, especially in respect of the projected image I1, the control unit may thus determine a temperature, or a temperature increment, that must be added to the values of the obtained temperature profile PT1, to obtain a realistic indication of the temperature in the central, turned-on zone. In the provided example, for the zone farthest from the sensors 221, 222, 223, 224, which are at the corners of the pixel matrix array 210, the increment ΔT1 may be of a value comprised between 15 and 30° C., and for example 25° C. The estimated temperature T is for example given by T2+ΔT1°.

The values of the increments or temperature values stored in the database, which depend on the positions of determined hot spots, may optionally be adapted depending on the operating time of the temperature sensors, to take into account measurement errors due to a variation in sensor sensitivity, which generally deteriorates with operating time.

After estimating the position of the hot spot of the pixelated light source 210, the control unit 230 is configured to determine an estimate of the temperature value T of the hot spot, depending on the estimated position, and preferably depending on the projected image data I1. The control unit 230 is in addition configured to determine, based on a delivered first current amplitude, delivered to the region of the light source 210 comprising the position of the hot spot, and based on the corresponding estimated temperature T of the hot spot of the pixelated light source, if there is a need to lower the amplitude of the current in the pixelated light source, in order to prevent overheating.

For example, if the estimated temperature T of the hot spot exceeds a predetermined threshold value, the first current level is thus lowered to a lower, second current level. This causes the amplitude of the maximum, or peak, current passing through the pixels corresponding to the hot spot 221 of the pixelated light source 210 to decrease, thus avoiding overheating of the corresponding semiconductor junctions.

The lowered amplitude of the current is applied via a command Iout which contains current amplitude setpoints Iout(212) either for specific elementary light sources 212, or for a group of elementary light sources, preferably comprising the position of the identified hot spot, or for all the elementary light sources 212 of the pixelated light source.

In one alternative embodiment, the voltage level Iout may be kept at the first level, and, to reduce the average amplitude of the currents flowing through the elementary light sources, the PWM signals controlling these average current amplitudes may be adapted by reducing their duty cycles by a predetermined factor. A combination of adaptation of the peak-current control and of PWM signals may also be envisioned without departing from the scope of the present invention.

Needless to say, the described embodiments do not limit the scope of the protection of the invention. Using the description provided above, other embodiments can be contemplated, yet without departing from the scope of the present invention.

The scope of protection is defined by the claims.

What is claimed is:

1. A method for controlling a pixelated light source for a motor vehicle comprising:

a plurality of elementary light sources with an electroluminescent semiconductor element, including:

i. controlling, through a control unit the pixelated light source so as to project a light beam corresponding to image data through driving each elementary light source with a control signal that determines a first average intensity of an electric current flowing through each elementary light source;

ii. obtaining a temperature profile of the pixelated light source by a plurality of temperature sensors arranged at predetermined locations;

iii. estimating a position of a hot spot of the pixelated light source based on the image data and of an obtained temperature profile by the control unit;

iv. estimating a temperature value of the hot spot based on an obtained temperature profile and on an estimated position of the hot spot relative to the predetermined locations of the plurality of temperature sensors by the control unit;

v. modifying a command of the control signal delivered to the pixelated light source by a means of the control unit such that at least one group of the elementary light sources that include the elementary light source located at the estimated position of the hot spot is crossed through by a current of a second average intensity that is lower than the first average intensity, if an estimated temperature value is greater than a predetermined threshold temperature value;

wherein the estimated position of the hot spot includes searching for the obtained temperature profile among a plurality of temperature profiles pre-recorded in a memory element; and wherein each temperature profile is associated with a particular image data and with a hot spot position associated with each data of the temperature profile associated with the particular image data.

2. The control method of claim 1, wherein estimating the position of the hot spot includes searching for the obtained temperature profile among the plurality of temperature profiles pre-recorded and stored beforehand in the memory element.

3. The control method of claim 1, wherein estimating a temperature value of the hot spot includes incrementing at least one of the temperature values of the obtained temperature profile, using a predetermined increment that depends on the estimated position of the hot spot.

4. The control method of claim 3, wherein estimating a temperature value includes taking into account a projected image data, and a high luminosity value of a pixel corresponding to the hot spot of the elementary said light source.

5. The control method of claim 1, wherein modifying the command includes comparing the estimated temperature value with the predetermined threshold temperature value, the predetermined threshold temperature value being dependent on a delivered first voltage level.

6. The control method of claim 1, wherein the pixelated light source is configured to be current-controlled such that a command that determines the first average amplitude of a current passing through each light source includes a first current amplitude for each elementary light source, and modifying the command includes delivering a second current level, lower than a first current level, to at least one group of elementary light sources of the pixelated light source if the estimated temperature value is higher than the predetermined threshold temperature value.

7. The control method of claim 1, wherein modifying the command includes driving each elementary light source with a signal of DC-current-modulating pulse-width-modulation (PWM) that determines the second average amplitude of a current passing through the elementary said light source, the second average amplitude being lower than the first average amplitude if the estimated temperature value is higher than the predetermined threshold temperature value.

8. A light-emitting assembly for a motor vehicle, comprising:

a pixelated light source that applies a plurality of elementary light sources that are electroluminescent-semiconductor-component-based, wherein the pixelated light source is intended to be voltage-controlled such that a command determining a first average amplitude of a current passing through each elementary light source includes a first voltage level;

a plurality of temperature sensors configured to deliver a temperature profile of the pixelated light source when projecting an image data; and a control unit, wherein the control unit is configured to control the pixelated light source depending on an estimated temperature value of a hot spot of the pixelated light source, which depends on an estimated position of the hot spot and on the image data;

wherein the control unit is configured to:

i. control the pixelated light source so as to project a light beam corresponding to image data, by driving each elementary light source with a control signal that determines the first average amplitude of the current passing through each elementary light source;

ii. obtain a temperature profile of the pixelated light source;

iii. compute the estimated position of the hot spot of the pixelated light source on the basis of the image data and of an obtained temperature profile;

iv. compute the estimated temperature value of the hot spot depending on the obtained temperature profile and on the estimated position with respect to predetermined locations of the plurality of temperature sensors; and v. modify a command delivered to the pixelated light source so that at least one group of the plurality of elementary light sources includes a particular elementary light source that is located at the estimated position of the hot spot passing through by a current of a second average amplitude that is lower than the first average amplitude, if the estimated temperature value is higher than a predetermined threshold temperature value;

wherein the estimated position of the hot spot includes searching for the temperature profile obtained from among a plurality of temperature profiles pre-recorded in a memory element; and wherein each temperature profile is associated with a particular image data and with a hot spot position associated with each data of the temperature profile associated with the particular image data.

9. The light-emitting assembly of claim 8, wherein the assembly includes the memory element functionally connected to the control unit that includes a pre-recorded reference data relative to the pixelated light source.

* * * * *